United States Patent Office 3,137,654
Patented June 16, 1964

3,137,654
STABILIZATION OF AQUEOUS ALKANOLAMINE SOLUTIONS IN GAS TREATING PROCESSES
Wayne W. Johnson, Vallejo, Marshall Lew, Richmond, and Robert E. McElwain, Vallejo, Calif., assignors to the United States of America as represented by the Secretary of the Navy
No Drawing. Filed Mar. 28, 1961, Ser. No. 98,986
9 Claims. (Cl. 252—189)
(Granted under Title 35, U.S. Code (1952), sec. 266)

The invention described herein may be manufactured and used by or for the Government of the United States of America for governmental purposes without the payment of any royalties thereon or therefor.

The present invention relates to gas treating processes and in particular to processes of the type employing an aqueous alkanolamine solution for absorbing a component of a gaseous mixture, such as a mixture of carbon dioxide and oxygen.

Aqueous alkanolamines have been employed in a variety of gas treating processes such, for example, as the ethanolamine process used in a number of industrial systems for removing carbon dioxide from air, flue gas, exhaust gas, or other gases.

Another important and presently pertinent process is that employed in nuclear or other submarines to constantly purify the submarine atmosphere by removing from it carbon dioxide and other impurities. In this particular application, the submarine incorporates what is known as a $CO_2$ scrubber which utilizes monoethanolamine solution (MEA) for absorbing carbon dioxide when relatively cool and releasing it when heated. One such scrubber is shown in U.S. patent application Serial No. 798,309. As there shown, it employs a sizeable stripping tower or tank into which the ship's atmosphere is pumped and in which the atmosphere which contains both oxygen and carbon dioxide is intimately mixed with the MEA solution. The $CO_2$-enriched MEA solution then is delivered, usually through appropriate heat exchangers, to a reboiler in which it is heated to a point sufficient to cause the release of $CO_2$ which then can be passed through a condenser and either pumped overboard or put to any other desired use. The MEA absorbent which then is at least partially cleansed, is recycled to the stripping tower in which it again mixes with the ship's atmosphere pumped into this tower. In returning the cleansed solution to the tower, it customarily again is passed through suitable heat exchanges so as to become sufficiently cool to absorb the $CO_2$ contained in the atmosphere admitted to the tower. By continuing the absorbing, reboiling and recycling process, the admitted gases eventually become sufficiently pure to be returned to the ship although it is customary to utilize an air purification system immediately prior to its return so as to assure adequate purity. Frequently, bisulfates and other chemicals are used in the air purification and the amount needed depends on efficiency of the scrubber operation.

Although such a gas treating process has proven entirely feasible and advantageous, it nevertheless poses certain problems which have been recognized but not solved in as satisfactory manner as could be desired. The particular problem with which the present invention is concerned is that the ethanolamine solutions deteriorate very rapidly due mostly to oxidation in the presence of air or other gases containing even a small amount of oxygen.

The deterioration usually manifests itself by a darkening of the solution as well as by a noticeable amount of ammonia which apparently forms as a gaseous deterioration product and which frequently remains in the air returned to the ship. Of course, in any attempt to provide a healthful atmosphere for submarine personnel, or even in industrial applications, the presence of the ammonia is most undesirable. Another difficulty is that the deterioration requires considerable make-up solution to adequately perform the desired $CO_2$-stripping function, as well as considerable chemical in the purification phase.

Both of these problems are considerably aggravated in submarine gas treating applications where, of course, any appreciable amount of ammonia and other gases are intolerable. The need for substantial make-up solution also affects submarine operation, particularly the operation of nuclear submarines which are intended for unusually long under-way periods during which excessive amounts of make-up solution have to be carried. Since space and weight are at a premium in such submarines, the necessity for copious reservoirs is manifestly sacrificial.

It is therefore the general object of the present invention to provide a method for reducing the deterioration rate of alkanolamine solutions employed in gas treating processes of the type under consideration.

Further related objects are to minimize the need for make-up solution, significantly reduce the amount of chemicals required to counteract gaseous deterioration products, effectively combat the formation of these gaseous deterioration products and, in general, to benefit submarine operations by improving environmental conditions and by minimizing the space required for storing make-up solutions.

The objects of the invention are accomplished principally by incorporating in the alkanolamine solutions particular chelating agents which, preferably, are incorporated in particular proportional amounts.

Considering the invention in more detail, it has been found that the deterioration rate of primary alkanolamines is most significantly reduced by incorporating in this alkanolamine solution a glycine, such as N,N-disubstituted glycine or a salt of such a disubstituted glycine. N,N-disubstituted alanines and their salts also can be employed, and it is notable that beneficial results are obtainable with at least secondary as well as primary alkanolamines.

More specifically, the preferred stabilizing materials utilized in the method of the present invention all are chelating agents and, structurally, they may be N,N-disubstituted glycines and their salts having the following active structure:

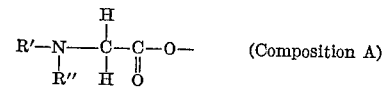 (Composition A)

In the above active structure, the carboxyl group may have a hydrogen attached to the oxygen, or sodium and other salts may be formed. Further, the material may be present in either soluble or insoluble form.

Three materials, in particular, have been found to yield unusually good results, the first and best of these materials being a product marketed by Dow Chemical Company, registered trade name Versene Fe-3 Specific, hereinafter referred to as VFS. Structurally this material is the monosodium salt of N,N-dihydroxyethylglycine, in which, referring to the above active structure, has its R' and R" radicals both present as hydroxyethyl groups ($HOC_2H_4$). The next best material also marketed by Dow Chemical Company under the registered trade name Versenol 120 is a technical grade trisodium salt of N-hydroxyethyl-ethylenediaminetriacetic acid. A third material of intermediate but entirely satisfactory effectiveness, is a product manufactured by the American Cyanamid Company under the registered trade name Cyquest 40, this material being the tetrasodium salt of ethylenediaminetetraacetic acid.

Again referring back to the active structure of N,N-disubstituted glycines, it may be noted that Versenol 120 is a material in which the radical R' is

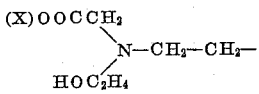

while the radical R" is

As to Cyquest 40, which is the same as Versene, its radical R' is

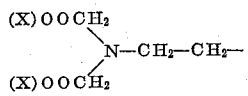

and the radical R" is

In the foregoing examples, the (X) is left as an unknown since it may be either a positive ion or a hydrogen ion.

For simplicity in subsequent consideration both in the specification and claims, the possible substituents for radicals R' and R" will be termed Compositions B, C, D and E of which:

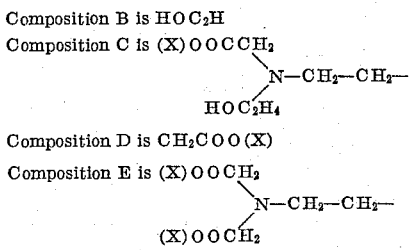

Although the foregoing materials are preferred, it is believed manifest that similar N,N-disubstituted alanines would function similarly to the disubstituted glycines, since glycines and alanine compounds both are in themselves quite resistant to air oxidation and have other similarities which are well known. The active structure of N,N-disubstitute alanines is

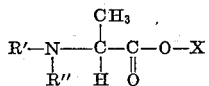

while the substituents contemplated are the same as those indicated for glycine.

Before specifically describing the test results which have established the effectiveness of these materials, it may be well to note other physical properties in addition to the fact that all are chelating agents. For example, VFS is a clear straw-colored aqueous solution with a specific gravity of 1.21, containing 40% solids. The ph of a 1% solution is 12 and the solution in general is recommended for chelating iron in solutions ranging from strongly acid to moderately alkaline. Versenol 120 is a clear yellow-colored liquid with a specific gravity of 1.31 and the ph of a 1% solution is 11.3. Cyquest 40 is a clear straw-colored solution with a specific gravity of 1.3, containing 40% solids and the ph of a 1% solution is 11.2.

In establishing characteristics of the preferred materials of the present invention, a particular test method was employed and, in addition to testing the materials which have been mentioned, other materials were employed to provide comparative results. Such other materials included copper and iodide, hydroquinone, decolorizing carbon and ammonium vanadate all of these materials having been suggested in the art so as to be pertinent for comparative findings. Further, as would be expected, the solutions were tested both with the preferred chelating agents as additives and without these additives, these tests being conducted to determine the overall reduction in the deterioration rate accomplished by the additives.

Testing has been accomplished both in actual, commercially-operating $CO_2$ scrubber equipments and in what amounts to specially-devised laboratory test equipment. Since the special test equipment eliminates many of the variables and unknowns present in the entire $CO_2$ scrubber equipment, the results to be described will be those provided in this manner. However, it is noted that the tests on full-size scrubbers were successful.

In carrying out the various tests, 100 milliliters of carbonated monoethanolamine (MEA) solution were placed in a 250 ml. flask having two side arms and one neck. A piece of mild steel also was placed in the flask and presaturated air, at a rate of 500 ml. per minute, introduced through one side arm and dispersed in the solution by means of a porosity "C" gas dispersion tube with a 20 mm. fritted disc. The other side arm was used for temperature measurement and correction of solution level by water addition. The flask was warmed by a hot plate which was controlled with a variable transformer.

The dispersed air left the flask through the neck and passed upwardly first through a vertical water-jacketed condenser having a 250 ml. filter flask, serving as a moisture trap, and then through a potash bulb containing about 10 ml. of a special cationic ion exchange resin. The function of the resin was to collect ammonia, amine and any other alkaline or ionized gaseous product.

Carbon dioxide was introduced to the solution through glass tubing passing downwardly through the condenser, this gas being bubbled into the MEA at the rate of one small bubble per second to provide a concentration in the air approximating one percent.

At the conclusion of each test run the MEA solution was collected, combined with washings from all parts, measured and titrated for alkalinity. The normality value thus obtained was corrected for solution volume and compared with that of the initial solution.

The alkaline vapors were recovered from the resin by regeneration with sulfuric acid, and ammonia in the regenerant was determined by the usual Kjehldahl methods and calculated as milli-equivalents.

As subsequently will become apparent, some of the tests involved variations in test conditions and solution treatment methods, these variations, for the most part, being appended as footnotes to the table of test results given below.

A tabulation of test results is provided in the following Table I. It is believed that the information there provided will be self-evident although it should be pointed out that the column entitled "AC" stands for "Air Contaminant" which, as just mentioned, has been calculated as milliequivalents. It also may be helpful to note that changes in solution normality although often small, closely followed the same pattern as the air contaminant (AC) values. The latter are believed to provide the better means of test result comparisons.

TABLE I

*Aeration Test Results*

Solution volume—100 ml.

Air rate—500 cc. per minute

[Metal Contacted—Mild Steel, except where indicated in notes]

| Run | °C | Hours | Additive | Solution Normality Start | Solution Normality Final | AC | Color | Fe, p.p.m. |
|---|---|---|---|---|---|---|---|---|
| 1 | 26 | 48 | None | 4.16 | 4.07 | 0.47 | Yellow | |
| 2 | 32 | 48 | ___do___ | 4.14 | 3.99 | 1.01 | Dark Yellow | |
| 3 | 40 | 48 | ___do___ | 4.14 | 4.02 | 2.79 | Wine red | |
| 4 | 45 | 48 | ___do___ | 4.16 | 3.92 | 3.69 | Dark red | |
| 5 | 45 | 48 | VFS,[1] 2.25% | 4.14 | 4.05 | 0.16 | Colorless | 6 |
| 6 | 45 | 48 | Dowex A-1, 2g./100 ml. | 4.06 | 3.91 | 1.72 | Yelow | 6 |
| 7 | 45 | 48 | CUSO$_4$+KI [1] | 4.14 | 3.89 | 2.17 | Greenish-yellow | 8 |
| 8 | 26 | 38 | CUSO$_4$+KI | 4.14 | 3.99 | 0.71 | ___do___ | 0.06 |
| 9 | 45 | 48 | VFS, 1.13% | 4.06 | 4.08 | 0.21 | Colorless | |
| 10 | 45 | 48 | VFS, 4.5% | 4.06 | 4.01 | 0.23 | ___do___ | |
| 11 | 45 | 48 | VFS (boiled),[2] 1.65% | 3.93 | 3.91 | 0.22 | ___do___ | |
| 12 | 45 | 100 | None | 4.09 | 3.70 | 5.72 | Dark Red | |
| 13 | 45 | 100 | VFS, 2.25% | 4.09 | 4.05 | 0.36 | Colorless | 6 |
| 14 | 55 | 100 | VFS, 2.25% | 4.06 | 4.08 | 0.49 | ___do___ | 7 |
| 15 | 55 | 76 | None, Nitrogen [3] | 4.12 | 4.09 | 0.70 | ___do___ | |
| 16 | 55 | 100 | VFS, Autoclaved [4] | 3.92 | 3.80 | 0.69 | ___do___ | |
| 17 | 55 | 48 | None, Autoclaved [4,5] | 4.01 | 3.89 | 2.23 | Yellow | |
| 18a [6] | 55 | 50 | None | 4.11 | | 4.51 | Red | |
| 18b | 55 | 50 | VFS, 2.25% | | 3.85 | 1.64 | Change from red to yellow | |
| 19 | 55 | 48 | VFS, 0.28% | 4.01 | 3.97 | 1.05 | Light yellow | 11 |
| 20 | 55 | 48 | VFS, 0.07% | 3.93 | 3.83 | 1.45 | ___do___ | |
| 21 | 55 | 48 | VFS, 0.56% | 4.27 | 3.98 | 1.31 | ___do___ | |
| 22 | 55 | 48 | None, Nitrogen [3] | 4.19 | 4.17 | 0.50 | Yellow | |
| 23 | 55 | 48 | VFS, 2.25% | 4.11 | 4.02 | 0.24 | Colorless | 7 |
| 24 | 55 | 48 | Versenol 120, 2.25% | 4.34 | 4.30 | 0.48 | ___do___ | 10 |
| 25 | 55 | 48 | Cyquest 40, 2.25% | 4.30 | 4.25 | 1.22 | ___do___ | |
| 26 | 45 | 78 | VFS,[7] 2.25% | 4.04 | | 0.30 | ___do___ | |
| | | 167 | | | | 0.16 | ___do___ | |
| | | 263 | | | 4.04 | 0.15 | Very faint yellow | |
| 27 | 55 | 100 | Ammonium Vanadate, 0.1% | 4.27 | 4.07 | 3.41 | Red | |
| 28 | 45 | 120 | None [8] | 3.98 | | 4.83 | ___do___ | |
| | | 216 | | | | 4.74 | ___do___ | |
| | | 312 | | | 3.49 | 3.11 | Dark red | |
| 29 | 55 | 48 | None [9] | 2.63 | 2.40 | 5.16 | Red | |
| 30 | 55 | 48 | VFS,[10] 2.25% | 2.58 | 2.57 | 0.29 | Colorless | |
| 31 | 55 | 48 | None [11] | 4.06 | 3.93 | 3.23 | Dark yellow | 0.3 |
| 32 | 55 | 24 | None [12] | 4.11 | | 2.61 | | |
| | | 24 | | | | 2.88 | | |
| | | 24 | | | | 3.04 | | |
| | | 24 | | | 3.56 | 2.86 | Red | |
| 33 | 55 | 24 | VFS,[12] 2.25% | 4.05 | | 0.55 | | |
| | | 24 | | | | 0.17 | | |
| | | 24 | | | | 0.15 | | |
| | | 24 | | | | 0.17 | Colorless | |
| 34 | 55 | 48 | None [13] | 4.11 | 3.83 | 4.63 | Dark yellow | 0.9 |
| 35 | 55 | 48 | None [14] | 3.96 | 3.67 | 4.72 | ___do___ | 0.4 |
| 36 | 55 | 48 | VFS,[14] 2.25% | 3.96 | 3.91 | 0.15 | Colorless | 1 |
| 37 | 55 | 48 | None [15] | 4.01 | 3.73 | 4.79 | Red | |
| 38 | 55 | 48 | VFS,[14] 2.25% | 3.83 | 3.82 | 0.15 | Colorless | |
| 39 | 55 | 48 | Decolorizing carbon | 4.12 | 3.62 | 7.02 | ___do___ | |
| 40 | 55 | 72 | None [16] | 2.91 | 2.33 | 1.24 | Yellow | |
| 41 | 55 | 72 | VFS,[16] 2.25% | 3.02 | 3.03 | 0.28 | Colorless | |

NOTES ON TABLE I

[1] Additives were used on the basis of a CO$_2$ Scrubber charge (44 gallons MEA solution).
VFS—1 gallon per 44 gallons MEA solution=Approximately 2.25% by volume.
CuSO$_4$ and KI—2 lb. KI and 3 oz. CuSO$_4$ per 44 gallons MEA solution.
"Versene FE-3 Specific" was used whenever reference to VFS is made.

[2] Before the aeration test MEA-VFS mixture was boiled under reflux in contact with mild steel, and in equilibrium with CO$_2$ for 100 hours. Both the MEA-VFS mixture and untreated MEA showed no loss in alkalinity during the boiling. In each case 0.15 milliequivalent alkaline vapor were collected.

[3] Nitrogen was used instead of air. No additives.

[4] Before the aeration test the mixture was held at 285° F. in a steam autoclave in contact with mild steel, and in equilibrium with CO$_2$ for 100 hours. The MEA-VFS mixture lost 0.01 N during the autoclaving. An MEA solution without inhibitor lost 0.07 N during the same treatment.

[5] Due to apparatus breakdown, the experiment was terminated short of the 100 intended hours. Air rate value for the 48-hour period is uncertain.

[6] Tests 18a and 18b were performed with the same solution: 50 hours with no additive, followed by 50 hours with VFS.

[7] Solution from run 16 (see note 4). Stainless steel was used instead of mild steel. Trap samples were replaced and analyzed at the indicated cumulative elapsed time intervals. Total time, including run 16—363 hours. Total air contamination—1.30 meq.

[8] Solution from run 17 (see notes 4 and 5). Stainless steel was used instead of mild steel. Trap resin was replaced and analyzed at the indicated cumulative elapsed time intervals. Total time including run 17—360 hours. Total air contamination—14.91 meq.

[9] Mild steel corrosion specimens showed a penetration of less than 0.001 i.p.y.

[10] Mild steel corrosion specimens showed a penetration of less than 0.001 i.p.y.

[11] Solution was prepared from comparatively new concentrated MEA having a low iron content (1 p.p.m.). No metal panel was placed in the solution.

[12] Solution aerated for 96 hours. Trap resin was replaced and analyzed each 24-hour period.

[13] Solution was prepared from comparatively new concentrated MEA having a low iron content (1 p.p.m.). Two carbon steel panels were placed in the solution, thereby doubling the exposed area.

[14] Same as note 1 3except one panel (normal for most tests) was exposed.

[15] Air rate was 250 c.c. per minute: one-half the rate for most of the runs.

[16] The absorbent solution was DEA.

Referring to Table I, runs 1, 2, 3 and 4, as well as a comparison of run 12 with run 17, show that in untreated solutions, the rate of deterioration increases rapidly with increase in temperature. This showing, coupled with other data, indicated the advisability of operating CO$_2$ scrubbers and related equipment at the lowest possible temperature.

Runs 5, 9 and 10, which were at 45° C. and of a 48 hour duration, show a decided reduction in deterioration and air contamination (about 20 fold) when VFS is used. In the 100-hour series, the reduction is about 16 fold (runs 12 and 13).

Runs 6, 7 and 8 indicate that Dowex A-1, and copper and iodide are intermediate in effectiveness. Dowex A-1 is a registered trade name identifying an ion exchange resin marketed by the Dow Chemical Company, the resin consisting of a styrene-divinylbenzene copolymer resin containing iminodiacetate active groups. By virtue of these groups, the resin exhibits strong preference for heavy metal cations as opposed to ordinary ion exchange resins which have preference for the light metal ions. The use of copper and iodide was suggested by the disclosure of Bruce T. Alexander contained in his U.S. Patent No. 2,559,580, issued July 10, 1951.

As to preferred proportions of the additive, runs 9 and 10 show that VFS in a proportion of 1.1 and 4.5 percent are equally inhibitive at 45° C., while run 5 demonstrates better inhibition for a proportion or concentration of 2.25 percent. Later tests at 55° C. (runs 19, 20, 21, 23) indicate that the best concentration for the test system is in the order of 2.25 volume percent. As is stated in footnote one of Table I additives were used on the basis of a $CO_2$ scrubber charge of 44 gallons MEA solution. In other words, using VFS, 1 gallon per 44 gallons MEA solution will equal 2.25 percent by volume.

Runs 11 and 16 show that there is comparatively little effect on the stabilizing ability of the VFS due either to boiling or being held at 285° F. A comparison of run 16 with run 17 demonstrates a substantial reduction in air contaminant (AC) from an autoclaved solution containing VFS as compared to an autoclaved solution containing no adidtive.

Run 15 shows that an untreated MEA solution when contacted with nitrogen gas releases a quantity of volatile contaminant very nearly equal to that obtained with aerated solutions containing VFS. Nitrogen being a non-oxidizing gas, it is quite apparent that the quantity of volatile contaminant is heavily influenced by the presence of oxidizing conditions.

In run 18, MEA solution containing no additive was aerated for 48 hours following which VFS was added and aeration continued for another 48 hours. Comparison of air contamination (AC) figures show substantial reduction in degradation after the VFS was added. The contamination value, however, was higher than that found with a new unoxidized solution to which VFS had been added. It is noteworthy that following the addition of VFS, the oxidized solution became much lighter in color and remained light for the rest of the second 48-hour period.

Runs 19, 20, 21 and 23 again are pertinent to considerations affecting VFS concentrations. Runs 19, 20 and 21 show that volatile loss is reduced greatly at relatively low concentrations of VFS. Comparisons with run 23 indicate that a quantity in the order of 2.25 volume percent for this system is necessary for maximum stability, at least at 55° C. At 45° C. smaller concentrations are satisfactory (runs 6, 7 and 8).

The other chelating materials already described (Versenol 120 and Cyquest 40) are shown in runs 24 and 25 to be quite effective in reducing oxidation.

Run 26 is a continuation of run 16 at the conclusion of which the solution containing VFS had been heated at 285° F. for 100 hours, then aerated for 100 hours at 55° C. and for 263 hours at 45° C. for a total of 363 aerated hours. The contaminant values indicate that the rate of oxidation did not increase with age of the MEA. The total air contamination was 1.3 milliequivalents.

Run 28 is the counterpart of run 26 for untreated MEA. The autoclaved solution was aerated at 55° C. for 48 hours and for 312 hours at 45° C. The contaminant values indicate that the rate of oxidation did not increase with age. The total air contamination value was 14.9 meq. giving a ratio to the contaminant obtained with VFS of 11.5. Had the solution been aerated for the full 100 hours at 55° C. the contaminant value for this run would have been higher and the ratio would be nearer to the 16 or 20 found in the shorter tests.

Run 27 indicates that vanadate salts failed to show appreciable solution stabilization.

Runs 29 and 30 indicate negligible corrosion in both treated and untreated series, it being noted from footnotes 9 and 10 that mild steel specimens were used in these two runs.

It was possible at this stage to perform an experiment with relatively new MEA having a low iron content. In run 31 a 4 N solution was aerated without contact with mild steel so there would be no change of iron build-up during aeration. The results show appreciable darkening of the solution and substantial contaminant concentration, the numerical value being somewhat lower than usually obtained with older solutions of higher iron content. However the degradative factors are marked enough to infer that neither the age of MEA since its manufacture, nor iron content, were key factors in MEA degradation insofar as unstabilized solutions are concerned.

Whether or not the oxidation rate changes with time was investigated in runs 32 and 33. With untreated solutions the indications are that there is slight, if any, acceleration, the rate being essentially constant over the 96 hour period. VFS treated solutions also showed no acceleration of the oxidation rate. A value of 0.55 was obtained in the first 24 hour period compared with values of 0.15 and 0.17 for the succeeding periods of the VFS run. The first value is suspect since it is abnormally high for the test conditions. Using the value of 0.55, the cumulative ratio of air contamination for unstabilized versus stabilized solutions is 11. Using a more reasonable value of 0.17 for the first period, the ratio is 17.

In runs 34 and 35 the area of exposed carbon steel was varied; in run 34 the area was doubled, and in run 35 it was normal. Comparison of data from these runs along with the data from run 31 shows a high degree of air contamination with unstabilized solutions which is relatively independent of the surface area of the mild steel so far as effecting a practical reduction in air contaminant content is concerned. These runs, with low iron initial solution, show about as much air contamination as solutions with higher iron content (run 18a). After aeration and exposure to steel, the iron in the solutions having low initial iron content increased somewhat, but remained much below that of aerated high iron solutions.

The degree to which air contamination could be reduced with VFS in the low iron (and newer) solution is shown in run 36. The contaminant content was about one-half the values obtained in solutions with high initial iron content (runs 23, 30). A repetition of run 36, run 38, verifies this. Thus it is possible that the best improvement in air contamination may result in scrubber operation from the use of VFS with relatively new MEA of low iron content. The reason low iron VFS treated solutions show some improvement over high iron VFS treated solutions, while low iron untreated solutions show little improvement over high iron untreated solutions, is not readily apparent.

In run 37, with unstabilized solution, the air flow rate was reduced to one-half the usual value of 500 cc. per minute. Since the total air contamination value is nearly the same as that obtained at 500 cc. per minute, it can be presumed that the rate of oxidation is not a function of the air rate, and that with the higher (and lower) air flow equilibrium is reached in the contacting apparatus. The contaminant concentration of the air at the low rate is about double that at the high rate, but the gross contamination is nearly the same in each case.

The use of decolorizing carbon in the aeration flask (run 39) resulted in decolorization of the MEA, but the reduction in MEA concentration and quantity of air contaminant were higher than obtained in any of the other runs. Activated carbon, therefore, might be suspected of increasing rather than decreasing the rate of oxidation.

Hydroquinine (two percent concentration in the MEA solution) was tested with the result that insoluble material formed which made the apparatus inoperative.

Runs 40 and 41 indicate that VFS will stabilize secondary amines such as diethanolamine.

Prior to run 18 a stock solution of diluted MEA was used for the tests. During the testing period some precipitation of iron in the solution occurred, so that starting iron values are not certain. In runs following No. 17 a freshly made solution was used each time. The concentrated MEA contained 52 p.p.m. of iron, and the nominal 4 N solutions contained approximately 14 p.p.m. at start. Most solutions showed a decline in iron concentration during the test. Final solutions containing Versene usually showed a slightly higher iron content than uninhibited final solutions.

The original MEA for runs 31, 34, 35, 36 and 38 was relatively new and contained only one p.p.m. iron. The diluted solution, at start, contained 0.3 p.p.m. Comparisons with this solution are, then, actually comparisons with relatively new and also low iron MEA.

Summarizing the results of Table I it is apparent that MEA solutions to which no oxidation inhibitors have been added undergo oxidation at a rate which increases by a factor of 2 to 3 for each 10° C. change in temperature. This oxidation is not greatly influenced by the concentration of iron in the solution, nor by the surface area of exposed steel specimens.

Aerated carbonated MEA solutions to which chelating agents have been added do not oxidize as rapidly as untreated solutions. VFS has been found to be the most effective chelating agent tried. It reduces the oxidation rate to about 5 percent of that of an uninhibited solution. This reduction corresponds quite closely to that which is obtained with an uninhibited solution treated with nitrogen rather than air, indicating the possibility of almost total oxidation inhibition by VFS. Approximately 2 volume percent of VFS based on solution volume is significant. Other chelating agents, particularly Versenol 120 and Cyquest 40 also have been found satisfactory. As may be noted in the test results, degradation of MEA invariably is accompanied by darkening and an early formation of a typical red color. Solutions which did not darken did not lose much strength and the quantity of alkaline air constituents was small. The solutions remaining remained uncolored only when VFS, Versenol 120 or Cyquest 40 were present.

Based upon the results given in Table I it is apparent that the three chelating materials have in common a marked ability to inhibit oxidation. Structurally, these three chelating materials are related in that the existence of a tertiary nitrogen is common to them. Also, all are disubstituted glycines, the two best materials VFS and Versenol having at least one hydroxyethylimino group, the nitrogen atom being the same one which forms the glycine. The best material VFS, has two hydroxyethyl groups attached to the glycine nitrogen atom. This compound has 3 electronegative oxygenated substituents on one tertiary nitrogen, the oxygen being attached to the beta carbon atom in each case.

It further may be noted that the agents are effective in reducing the deterioration rate of secondary amines.

Obviously many modifications and variations of the present invention are possible in the light of the above teachings. It is therefore to be understood that within the scope of the appended claims the invention may be practiced otherwise than as specifically described.

What is claimed is:

1. A method of stabilizing an aqeuous monoethanolamine solution against deterioration comprising incorporating in said solution a chelating agent selected from a group of compounds consisting of N,N-dihydroxyethylglycine, salts of N,N-dihydroxyethylglycine, N-hydroxyethylethylenediaminetriacetic acid, salts of N-hydroxyethylethylenediaminetriacetic, ethylenediaminetetraacetic acid, and salts of ethylenediaminetetra-acetic acid, said agent being incorporated in sufficient quantity to provide a concentration in said solution of 1.1–4.5 volume percent.

2. A method of stabilizing an aqueous monoethanolamine solution against deterioration comprising incorporating in said solution the monosodium salt of N,N-dihydroxyethylglycine, said salt being incorporated in sufficient quantity to provide a concentration in said solution of 1.1–4.5 volume percent..

3. A method of stabilizing an aqueous monoethanolamine solution against deterioration comprising incorporating in said solution the monosodium salt of N,N-dihydroxyethylglycine, said salt being incorporated in sufficient quantity to provide a concentration in said solution of 2.25 volume percent.

4. A method of stabilizing an aqueous monoethanolamine solution against deterioration comprising incorporating in said solution the trisodium salt of N-hydroxyethylethylenediaminetriacetic acid, said salt being incorporated in sufficient quantity to provide a concentration in said solution of 1.1–4.5 volume percent.

5. The method of stabilizing an aqueous monoethanolamine solution against deterioration comprising incorporating in said solution the trisodium salt of N-hydroxyethylethylenediaminetriacetic acid, said salt being incorporated in sufficient quantity to provide a concentration in said solution of 2.25 volume percent.

6. A method of stabilizing an aqueous monoethanolamine solution against deterioration comprising incorporating in said solution the tetrasodium salt of ethylenediaminetetraacetic acid, said salt being incorporated in sufficient quantity to provide a concentration in said solution of 1.1–4.5 volume percent.

7. The method of stabilizing an aqueous monoethanolamine solution against deterioration comprising incorporating in said solution the tetrasodium salt of ethylenediaminetetraacetic acid, said salt being incorporated in sufficient quantity to provide a concentration in said solution of 2.25 volume percent.

8. A method of stabilizing an aqueous ethanolamine solution against deterioration of the type produced when said solution is used in a gas treating process, said stabilizing method comprising incorporating in said solution the monosodium salt of N,N-dihydroxyethylglycine, said salt being incorporated in sufficient quantity to provide a concentration in said solution of 1.1–4.5 volume percent.

9. A method of stabilizing in aqueous ethanolamine solution against deterioration of the type produced when said solution is used in a gas treating process, said stabilizing method comprising incorporating in said solution the monosodium salt of N,N-dihydroxyethylglycine, said salt being incorporated in sufficient quantity to provide a concentration in said solution of 2.25 volume percent.

References Cited in the file of this patent

UNITED STATES PATENTS

| | | |
|---|---|---|
| Re. 23,905 | Bersworth | Dec. 14, 1954 |
| 2,442,457 | Chenicek et al. | June 1, 1948 |
| 2,559,580 | Alexander | July 10, 1951 |
| 2,723,222 | Stark | Nov. 8, 1955 |
| 2,869,978 | Fischer | Jan. 20, 1959 |

FOREIGN PATENTS

| | | |
|---|---|---|
| 461,011 | Great Britain | Feb. 2, 1957 |

OTHER REFERENCES

Chaberek et al.: "Organic Sequestering Agents," Wiley and Sons, Inc., N.Y., pages 307–316 (1959).

"Sequestrene," pub. by Geigy Industrial Chemicals, Div. of Geigy Chemical Corp., N.Y., 1952, pages 34 and 41.